(12) United States Patent
Pettit

(10) Patent No.: US 12,712,713 B2
(45) Date of Patent: Aug. 18, 2026

(54) GENERATING SHARED PRIVATE KEYS

(71) Applicant: nChain Licensing AG, Zug (CH)

(72) Inventor: Michaella Pettit, London (GB)

(73) Assignee: nChain Licensing AG, Zug (CH)

( * ) Notice: Subject to any disclaimer, the term of this patent is extended or adjusted under 35 U.S.C. 154(b) by 222 days.

(21) Appl. No.: 18/017,284

(22) PCT Filed: Jun. 28, 2021

(86) PCT No.: PCT/EP2021/067673
§ 371 (c)(1),
(2) Date: Jan. 20, 2023

(87) PCT Pub. No.: WO2022/022924
PCT Pub. Date: Feb. 3, 2022

(65) Prior Publication Data

US 2023/0224147 A1 Jul. 13, 2023

(30) Foreign Application Priority Data

Jul. 28, 2020 (GB) .................................... 2011686

(51) Int. Cl.
*H04L 9/08* (2006.01)
*H04L 9/14* (2006.01)
*H04L 9/32* (2006.01)

(52) U.S. Cl.
CPC ............ *H04L 9/085* (2013.01); *H04L 9/0861* (2013.01); *H04L 9/14* (2013.01); *H04L 9/3242* (2013.01)

(58) Field of Classification Search
CPC ......... H04L 9/085; H04L 9/0861; H04L 9/14; H04L 9/3242; H04L 9/3239; H04L 9/325; H04L 9/3255; H04L 9/50; H04L 9/3247
See application file for complete search history.

(56) References Cited

U.S. PATENT DOCUMENTS 7,246,232 B2 7/2007 Dutertre
8,144,874 B2 3/2012 McGough
(Continued)

FOREIGN PATENT DOCUMENTS

JP H11239124 A 8/1999
JP 2006203754 A 8/2006
(Continued)

OTHER PUBLICATIONS

A. Castiglione et al., "Hierarchical and Shared Access Control," in IEEE Transactions on Information Forensics and Security, vol. 11, No. 4, pp. 850-865, Apr. 2016, doi: 10.1109/TIFS.2015.2512533. (Year: 2016).*

(Continued)

*Primary Examiner* — Meng Li
*Assistant Examiner* — Taylor P Vu
(74) *Attorney, Agent, or Firm* — Galvani Smith PLLC

(57) ABSTRACT

A computer-implemented method of generating shares of private keys, wherein the method is performed by a first participant of a group of participants and comprises: obtaining a first seed share, wherein each other participant has a respective seed share; generating a first master private key share of a shared master private key, wherein the first master private key share is generated based on the first seed share and the respective seed share of each other participant, and wherein each other participant has a respective master private key share; and generating one or more first private key shares based on the first master private key share, wherein each first private key share is a share of a respective shared private key.

16 Claims, 4 Drawing Sheets

(56) References Cited

U.S. PATENT DOCUMENTS

| | | | |
|---|---|---|---|
| 8,806,197 B2 | 8/2014 | Struik et al. | |
| 9,813,244 B1 | 11/2017 | Triandopoulos et al. | |
| 9,894,151 B2 | 2/2018 | Dhuse et al. | |
| 10,211,981 B2 | 2/2019 | Camenisch et al. | |
| 10,491,404 B1 * | 11/2019 | Yamamoto | H04L 9/50 |
| 10,511,436 B1 | 12/2019 | Machani | |
| 10,574,451 B2 * | 2/2020 | Adams | H04L 9/0841 |
| 10,764,043 B2 | 9/2020 | Traynor et al. | |
| 10,797,865 B2 * | 10/2020 | Wu | H04L 9/085 |
| 10,903,991 B1 | 1/2021 | Craige et al. | |
| 11,323,267 B1 | 5/2022 | Griffin et al. | |
| 11,481,761 B2 | 10/2022 | Lam | |
| 11,563,567 B2 | 1/2023 | Le Saint | |
| 11,637,708 B2 | 4/2023 | Hung | |
| 11,973,867 B2 | 4/2024 | Tysor et al. | |
| 12,309,196 B2 | 5/2025 | Pettit | |
| 2002/0116611 A1 | 8/2002 | Zhou et al. | |
| 2003/0009694 A1 | 1/2003 | Wenocur et al. | |
| 2003/0059041 A1 | 3/2003 | Mackenzie et al. | |
| 2010/0037055 A1 * | 2/2010 | Fazio | H04L 9/3255 713/171 |
| 2011/0138192 A1 * | 6/2011 | Kocher | H04L 9/003 713/189 |
| 2012/0254619 A1 | 10/2012 | Dhuse et al. | |
| 2014/0164769 A1 | 6/2014 | D'Souza | |
| 2014/0325309 A1 * | 10/2014 | Resch | H04L 9/085 714/763 |
| 2015/0100781 A1 | 4/2015 | Yann et al. | |
| 2015/0288525 A1 | 10/2015 | Camenisch et al. | |
| 2017/0223008 A1 | 8/2017 | Camenisch et al. | |
| 2017/0250972 A1 | 8/2017 | Ronda et al. | |
| 2018/0060248 A1 | 3/2018 | Liu et al. | |
| 2018/0074889 A1 | 3/2018 | Resch et al. | |
| 2018/0101697 A1 | 4/2018 | Rane et al. | |
| 2018/0183601 A1 | 6/2018 | Campagna | |
| 2018/0212772 A1 * | 7/2018 | Leavy | H04L 9/085 |
| 2018/0307573 A1 | 10/2018 | Abraham et al. | |
| 2018/0349867 A1 | 12/2018 | Trieflinger | |
| 2018/0351754 A1 | 12/2018 | Wallrabenstein et al. | |
| 2019/0007205 A1 | 1/2019 | Corduan et al. | |
| 2019/0014124 A1 | 1/2019 | Reddy et al. | |
| 2019/0280864 A1 | 9/2019 | Cheng et al. | |
| 2019/0370792 A1 * | 12/2019 | Lam | G06Q 20/3678 |
| 2019/0372759 A1 * | 12/2019 | Rix | H04L 9/3263 |
| 2020/0005290 A1 * | 1/2020 | Madisetti | G06Q 20/065 |
| 2020/0044863 A1 * | 2/2020 | Yadlin | G06F 9/54 |
| 2020/0074450 A1 | 3/2020 | Fletcher et al. | |
| 2020/0145231 A1 | 5/2020 | Trevethan | |
| 2020/0153640 A1 * | 5/2020 | Ranellucci | H04L 9/3255 |
| 2020/0169391 A1 | 5/2020 | Kapp et al. | |
| 2020/0213099 A1 | 7/2020 | Wright | |
| 2020/0213113 A1 | 7/2020 | Savanah et al. | |
| 2020/0259638 A1 | 8/2020 | Carmignani et al. | |
| 2020/0259651 A1 | 8/2020 | Mohassel et al. | |
| 2020/0311678 A1 | 10/2020 | Fletcher et al. | |
| 2020/0353167 A1 | 11/2020 | Vivek et al. | |
| 2020/0389306 A1 * | 12/2020 | Dolan | H04L 9/3252 |
| 2021/0036841 A1 | 2/2021 | Craige et al. | |
| 2021/0049600 A1 * | 2/2021 | Spector | H04L 9/085 |
| 2021/0067345 A1 | 3/2021 | Shamai et al. | |
| 2021/0089676 A1 | 3/2021 | Ford et al. | |
| 2021/0090072 A1 | 3/2021 | Sewell et al. | |
| 2021/0352054 A1 | 11/2021 | Urian | |
| 2021/0359843 A1 | 11/2021 | Li et al. | |
| 2021/0377049 A1 | 12/2021 | Nix | |
| 2022/0172180 A1 | 6/2022 | Komiyama | |
| 2022/0182235 A1 | 6/2022 | Tysor et al. | |
| 2022/0239509 A1 * | 7/2022 | Jang | H04L 9/3236 |
| 2022/0286276 A1 | 9/2022 | Li et al. | |
| 2022/0311623 A1 * | 9/2022 | Tomlinson | H04L 9/3255 |
| 2022/0321340 A1 * | 10/2022 | Tsitrin | H04L 9/0838 |
| 2023/0066711 A1 | 3/2023 | Wright et al. | |
| 2023/0361993 A1 | 11/2023 | Camenisch et al. | |
| 2024/0054206 A1 | 2/2024 | Belgarric et al. | |

FOREIGN PATENT DOCUMENTS

| | | | |
|---|---|---|---|
| JP | 2007124032 | A | 5/2007 |
| JP | 2008199278 | A | 8/2008 |
| JP | 2013513312 | A | 4/2013 |
| JP | 2015194959 | A | 11/2015 |
| JP | 2018005089 | A | 1/2018 |
| JP | 2019507539 | A | 3/2019 |
| JP | 2020516164 | A | 5/2020 |
| WO | 9937052 | A1 | 7/1999 |
| WO | 2015160839 | A1 | 10/2015 |
| WO | 2017145010 | A1 | 8/2017 |
| WO | 2018189656 | A1 | 10/2018 |
| WO | 2019034951 | A1 | 2/2019 |
| WO | 2019034986 | | 2/2019 |
| WO | 2019158209 | A1 | 8/2019 |
| WO | 2019193452 | A1 | 10/2019 |
| WO | 2019246206 | A1 | 12/2019 |
| WO | 2020084418 | A1 | 4/2020 |
| WO | 2020230695 | A1 | 11/2020 |
| WO | 2020240319 | A1 | 12/2020 |
| WO | 2021213959 | | 10/2021 |
| WO | 2021254702 | | 12/2021 |
| WO | 2023072502 | A1 | 5/2023 |

OTHER PUBLICATIONS

PCT/EP2021/067673 International Search Report and Written Opinion dated Sep. 28, 2021, 13 pages.

GB2011686.9 Combined Search and Examination Report dated Apr. 22, 2021, 10 pages.

Adriano Di Luzio et al, "Arcula: A Secure Hierarchical Deterministic Wallet for Multi-asset Blockchains" section 2; Cornell University Library, 2019, pp. 6-7.

Steven Goldfeder et al, "We Securing Bitcoin wallets via threshold signatures", 2014, URL: https://www.cs.princeton.edu/~stevenag/bitcoin_threshold_signatures.pdf sections "Threshold ECDSA signature generation" and "Threshold deterministic address derivation"; pp. 4, 7.

Daniele Fornaro, "Elliptic Curve Hierarchical Deterministic Private Key Sequences: Bitcoin Standards and Best Practices" 2018, URL: https://www.politesi.polimi.it/bitstream/10589/140112/1/2018_04_Fornaro.pdf pp. 17-26.

Cachin Christian, "Security and Fault-tolerance in Distributed Systems—Distributed Cryptography", Dec. 31, 2012 (Dec. 31, 2012), XP055903112, Retrieved from the Internet: URL: https://cachin.com/cc/sft12/ distcrypto.pdf, sections 7.2, 7.3, 7.4.

Combined Search and Examination Report under Sections 17 and 18(3) for Application No. GB2105992.8 mailed on Jan. 17, 2022, 9 pages.

Damgard I., et al., "Fast Threshold ECDSA with Honest Majority", Aug. 23, 2020, Computer Vision—ECCV2020: 16th European Conference, Proceedings; Part of the Lecture Notes in Computer Science, 35 pages.

Denis Kolegov et al: "Towards Threshold Key Exchange Protocols", arxiv.org, Cornell University Library, 201 Olin Library Cornell University Ithaca, NY 14853, Dec. 27, 2020 (Dec. 27, 2020), XP081849900, section 2.2.

GB2101590.4 Combined Search and Examination Report dated Jul. 30, 2021,7 pages.

International Search Report and Written Opinion for Application No. PCT/EP2022/058085 mailed on Jul. 26, 2022, 14 pages.

Joonsang Baek et al: "Simple and efficient threshold cryptosystem from the gap diffie-hell ma n group", GLOBECOM '03. 2003-IEEE Global Telecommunications Conference. Conference Proceedings. San Francisco, CA, Dec. 1-5, 2003; [IEEE Global Telecommunications Conference] New York, NY, vol. 3, Dec. 1, 2003 (Dec. 1, 2003), pp. 1491-1495.

PCT/EP2022/050116 International Search Report and Written Opinion dated Apr. 26, 2022, 14 pages.

Pettit M. "Shared Secrets and Threshold Signatures," May 1, 2020, [retrieved on Jun. 14, 2021], pp. 1-23, Retrieved from the Internet: URL: https://nakasendoproject.org/Threshold-Signatures-whitepaper-nchain.pdf, sections 4 and 5; p. 22.

(56) References Cited

OTHER PUBLICATIONS

Combined Search and Examination Report under Sections 17 and 18(3) for Application No. GB2017103.9 mailed on Jun. 28, 2021, 13 pages.
International Search Report and Written Opinion for Application No. PCT/EP2021/076686 mailed on Feb. 14, 2022, 17 pages.
Combined Search and Examination Report for Application No. GB2009062.7, mailed on Mar. 12, 2021,10 pages.
Gennaro R., et al., "Robust Threshold DSS Signatures," International Conference on the Theory and Applications of Cryptographic Techniques, 2001, vol. 164, pp. 54-84.
International Search Report and Written Opinion for Application No. PCT/EP2021/062941, mailed on Aug. 3, 2021, 14 pages.
Pramanik S., et al., "VPSS: A Verifiable Proactive Secret Sharing Scheme in Distributed Systems," IEEE Military Communications Conference, MILCOM, Oct. 13, 2003, vol. 2, pp. 826-831, XP010698401, DOI: 10.1109/MILCOM.2003.1290219, ISBN: 978-0-7803-8140-7.
Combined Search and Examination Report under Sections 17 and 18(3) for Application No. GB2111440.0 mailed on Jan. 25, 2022, 6 pages.
Combined Search and Examination Report under Sections 17 and 18(3) for Application No. GB2111441.8 mailed on Jan. 25, 2022, 6 pages.
Combined Search Report under Sections 17 for Application No. GB2111442.6 mailed on Jan. 25, 2022, 4 pages.
Dikshit P., et al., "Efficient Weighted Threshold ECDSA for Securing Bitcoin Wallet," 2017 ISEA Asia Security and Privacy (ISEASP), IEEE, Jan. 29, 2017, pp. 1-9, DOI: 10.1109/ISEASP.2017.7976994.
Ewa Syta et al: "Keeping Authorities "Honest or Bust" with Decentralized Witness Cosigning", 2016 IEEE Symposium on Security and Privacy (SP), May 1, 2016 (May 1, 2016), pp. 526-545.
Gennaro R., et al, "Fast Multiparty Threshold ECDSA with Fast Trustless Setup," Proceedings of the 2018 ACM SIGSAC Conference on Computerand Communications Security, Oct. 2018, pp. 1179-1194.
Gennaro R., et al., "Robust Threshold DSS Signatures," International Conference on the Theory and Applications of Cryptographic Techniques, 1996, EUROCRYPT '96 pp. 354-371.
International Search Report and Written Opinion for Application No. PCT/EP2022/069246 mailed on Nov. 3, 2022, 15 pages.
International Search Report and Written Opinion for International Application No. PCT/EP2022/076636, mailed Jan. 20, 2023, 12 pages.
Wuille P., "BIP 32: Hierarchical Deterministic Wallets," Github Bitcoin BIPs, Feb. 2012, 6 pages, Retrieved from the Internet: URL: https://en.bitcoin.it/wiki/BIP_0032, Retrieved on Aug. 24, 2020.
Courtois N.T., et al., "Stealth Address and Key Management Techniques in Blockchain Systems," Proceedings of the 3rd International Conference on Information Systems Security and Privacy (ICISSP 2017), Feb. 21, 2017, pp. 559-566.
Boldyreva A., et al., "Threshold Signatures, Multisignatures and Blind Signatures Based on the Gap-diffie-hellman-group Signature Scheme," International Workshop on Public Key Cryptography, Berlin, Heidelberg: Springer Berlin Heidelberg, 2003, 16 pages.
Camenisch J., et al., "Short Threshold Dynamic Group Signatures," International conference on security and cryptography for networks Cham: Springer International Publishing, 2020, pp. 401-423.
Hideyuki F., et al., "Updating Method of Distributed Data in Secret Sharing System," Research Report of Computer Security (CSEC), Japan, Information Processing Society of Japan, May 15, 2014, vol. 2014-CSEC-65, No. 1, pp. 1-6, 10 pages.
Shingu T., et al., "Updating Method of Verifiable Distributed Data in the Secret Sharing Scheme," Japan, Information Processing Society of Japan, Nov. 28, 2014, vol. 2014-CSEC-67, No. 5, pp. 1-6, 9 pages.
Office Action of Korean Application No. 10-2023-7001201 dated May 6, 2026, 9 Pages.
Office Action for Japanese Patent Application No. 2024508061, mailed Apr. 28, 2026, 6 Pages.

* cited by examiner

Child Key Derivation Function ~ CKD(x,n) = HMAC-SHA512 ($x_{Chain}$, $x_{PubKey}$ || n)

GENERATING SHARED PRIVATE KEYS

CROSS REFERENCE TO RELATED APPLICATIONS

This application is the U.S. National Stage of International Application No. PCT/EP2021/067673 filed on Jun. 28, 2021, which claims the benefit of United Kingdom Patent Application No. 2011686.9, filed on Jul. 28, 2020, the contents of which are incorporated herein by reference in their entireties.

TECHNICAL FIELD

The present disclosure relates to a method of generating a plurality of shared private keys, or more specifically, generating respective shares of respective shared private keys.

BACKGROUND

In general, a shared secret may be used to share a data item that is distributed amongst a group of participants. Each participant has a different share of the secret. Normally, the secret can only be reconstructed when a certain number (referred to as the "threshold") of participants make their respective shares available, e.g. to be combined together to calculate the secret.

Public-key cryptography is a type of cryptographic system that uses pairs of keys: private keys which are known only to the owner of the private key, and public keys which are generated based on the corresponding private key and which may be disseminated without compromising the security of the private key.

Public-key cryptography enables a sender to encrypt a message using a recipient's public key (i.e. the public key corresponding to a private key known only to the recipient). The encrypted message can then only be decrypted using the recipient's private key.

Similarly, a sender can use their own private key to sign a message, e.g. to prove that the message is being sent by the sender, and/or to indicate that the sender agrees with the message. The signer (i.e. the party generating the signature) uses their private key to create a digital signature based on the message. Creating a digital signature based on a message means supplying the message and private key to a function that generate the signature based on both the message and private key. The signature is added to (e.g. tagged onto) the message or otherwise associated with the message. Anyone with the signer's corresponding public key can use the same message and the digital signature on the message to verify whether the signature was validly created, i.e. whether the signature was indeed made using the signer's private key. As well as ensuring the authenticity of a message, digital signatures also ensure the integrity and non-repudiation of the message. That is, a digital signature can be used to prove that a message has not been changed since it was signed with the signature, and that the creator of a signature cannot deny in the future that they created the signature.

A digital signature scheme typically involves three procedures, i.e. algorithms. A key generation algorithm is used to generate a random private key and a corresponding public key. A signing algorithm is used to generate a signature based on a message and the private key. A verification algorithm is used to verify, given a public key and the message, whether the signature has been generated using the corresponding private key and according to the signing algorithm.

A common use of a shared secret is as a shared private key of a private-public key pair. That is, the private key may be distributed amongst a group of participants such that no single participant has access to the private key. Therefore no single participant can generate a valid signature of a message. Instead, some or all of the participants must together generate the private key in order for the signature to be generated.

Instead of the participants sharing their private key shares in order to generate a signature, they may instead use a threshold signature scheme. A threshold signature scheme allows a threshold number of participants in a group to create a digital signature based on a message using individual shares of a shares private key, without the private key being made available to any one participant. Here, a digital signature is a signature which is generated based on the message to be signed. In such a scheme, the signature can only be created if the threshold number of participants agree to generate the signature on the message. Any attempt to generate a signature using a smaller number of participants will not generate a valid signature. Therefore, a valid signature by the group (i.e. one generated using the message and the shared private key) provably had the threshold number of people agree to generate the signature. This also implies that any adversary needs to obtain the threshold number of shares of the private key to forge a signature with that private key.

SUMMARY

As set out above, a shared secret may correspond to a shared private key. In many scenarios it is recommended that a given private key should not be used more than once. In addition, due to the nature of public-private keys, and in particular the difficulty in deriving the private key from a corresponding public key, it is essential that a private key is not lost. Therefore it would be desirable to be able to generate a series of "shared private keys" to prevent key reuse (i.e. to prevent a group of users having to re-use the same shared private key) and enable key recovery (i.e. to allow a group of users to reconstruct a shared private key).

According to one aspect disclosed herein, there is provided a computer-implemented method of generating shares of private keys, wherein the method is performed by a first participant of a group of participants and comprises: obtaining a first seed share, wherein each other participant has a respective seed share; generating a first master private key share of a shared master private key, wherein the first master private key share is generated based on the first seed share and the respective seed share of each other participant, and wherein each other participant has a respective master private key share; and generating one or more first private key shares based on the first master private key share, wherein each first private key share is a share of a respective shared private key.

Each participant in the group has a respective seed, e.g. a pseudo-randomly generated integer. From that seed, each participant generates a respective share of a master private key. A typical requirement of a shared secret scheme is that no single party has knowledge of the shared secret, which in this case is the master private key. Therefore each participant may perform a secret sharing scheme to share enough information to enable the creation of shares of the master private key without revealing the master private key itself.

Alternatively, the group of participants may use a dealer (e.g. a trusted third party) to distribute the information. It is also not excluded that the whole group may be trusted, in which case the participants may communicate freely amongst themselves. Regardless of whether the parties are trusted or not, each participant obtains a respective share of the master private key from which each participant can generate respective shares of one or more additional private keys, e.g. child private keys.

Since each participant has a share of the same master private key, they can each derive shares of the same additional private key(s). Therefore the group of participants can use different private keys to, for example, generate signature shares for signing messages, or for encryption and decryption of messages. This achieves the first aim of preventing re-use of a shared private key. Moreover, since the master private key shares are generated based on a seed known to each participant, if the master private key or a private key derived therefrom is lost, the private key(s) can be recovered. Thus the second aim of enabling key recovery of shared private keys is met.

A key structure, sometimes also referred to as a hierarchical deterministic (HD) wallet, is a collection of deterministically linked private keys, where at least some of the keys are associated with different levels and positions within the hierarchical structure. For instance, the master private key sits at the top of the hierarchy (i.e. level 0), with one or more child keys at the next level (i.e. level 1). Each child key at level 1 is linked to the master private key. Each child key at level 1 may be linked to one or more respective sets of child keys at level 2. Therefore whilst being children of the master key, the child keys of level 1 may also be parents to child keys of level 2. It will be appreciated that a HD wallet may contain any number of levels and keys.

Embodiments of the present invention enable a "shared wallet" of private key shares to be generated, where each private key can be traced back to (i.e. linked to) the master private key share. The shared wallet may take a form similar to a traditional HD wallet. Instead of each participant having a wallet of private keys, they now have a wallet of private key shares. When required, each participant can access their respective key share at the same level and position of the key structure in order to e.g. generate a signature share.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Preliminaries

Figure 1:
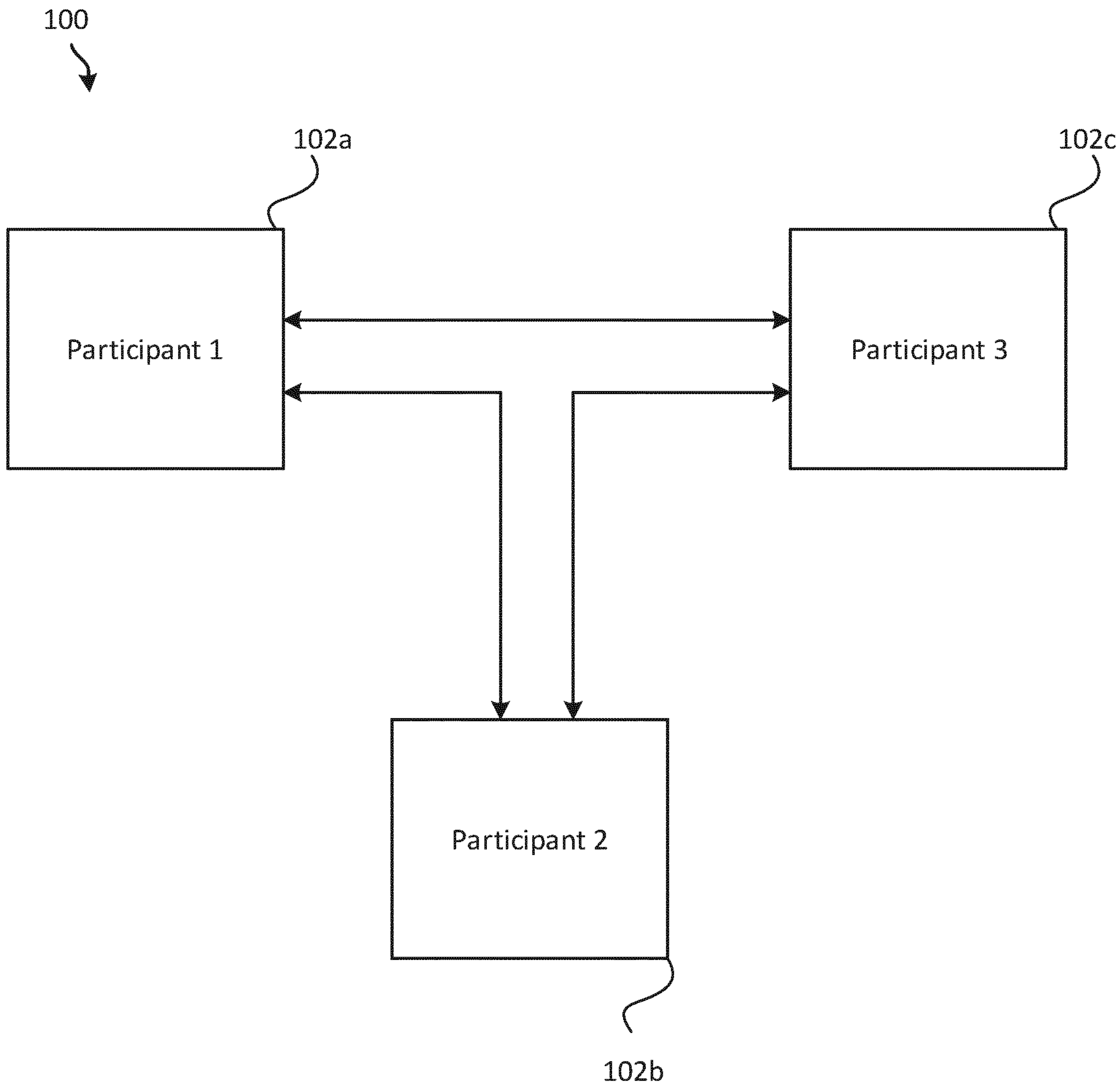
FIG. 1 is a schematic block diagram of a system for implementing embodiments of the present invention, and FIG. 2 schematically represents hierarchical deterministic key structure.

Whilst the following examples are described in terms of elliptic curve cryptography, the invention is not limited to any one particular cryptographic scheme and may in general be applied to any cryptographic scheme, e.g. RSA or other public key cryptography schemes.

Elliptic Curve Groups

An elliptic curve E satisfies the equation:

$$y^2 = x^3 + ax + b \bmod p$$

where $a, b \in \mathbb{Z}_p$ and a, b are constants satisfying $4a^3+27b^2 \neq 0$. The group over this elliptic curve is defined to be the set of elements (x, y) satisfying this equation along with the point at infinity $\mathcal{O}$, which is the identity element. The group operation on the elements in this group is called elliptic curve point addition and denoted by +. This group is denoted by $E(\mathbb{Z}_p)$ and its order by n.

This group operation can be used to define another operation on the elements called point multiplication denoted by ·. For a point $G \in E(\mathbb{Z}_p)$ and a scalar $k \in$ $$\mathbb{Z}_n^*,$$

the point k·G is defined to be the point G added to itself k times.

In elliptic curve cryptography, a private key is defined to be a scalar $k \in \mathbb{Z}_n \backslash \{0\}$ where $\mathbb{Z}_n \backslash \{0\}$ is notation for the set $\{1, \ldots, n-1\}$., and the corresponding public key is the point k·G on an elliptic curve. For instance, in some blockchain protocols, the elliptic curve is chosen to be the secp256k1 elliptic curve, and the values a, b, and p are completely specified by this curve. The order n of this group has been calculated given these values, which in the case of this curve is a prime, and the secp256k1 standard also specifies a point G which is to be used as the generator of this group.

Elliptic Curve Digital Signature Algorithm

In order to create a signature on a message msg, with the private key a, the following steps are taken:

1. Calculate the message digest e=hash(msg), where may be any hash function. For instance, in some examples hash(msg)=SHA256(SHA256(msg)) where SHA256 (■) is the SHA-256 hash function. Note that instead the message may be hashed only once, or more that two times with the same or different hash functions.
2. Chose a random integer $k \in \{1, \ldots, n-1\}$, where n is the order of the elliptic curve, e.g. the secp256k1 curve. In the following, k is referred to as the ephemeral private key.
3. Calculate the ephemeral public key corresponding to this ephemeral private key $k \cdot G = (R_x, R_y)$.
4. Calculate $r = R_x \bmod n$. If r=0, return to step 2.
5. Calculate the multiplicative inverse of the ephemeral key $k^{-1} \bmod n$.
6. Calculate $s = k^{-1}(e+ar) \bmod n$. If s=0, return to step 2.
7. The signature on the message msg is (r, s).

The ephemeral key must be kept secret, otherwise the private key can be calculated, given a message and signature. Additionally, each time a signature is generated, a different ephemeral key must be used. If this is not the case, it is possible to derive the private key a given two different signatures and their corresponding messages.

Given a message msg, a public key $P=a\cdot G$, and corresponding signature (r, s), then one can verify the signature by completing the following steps:

1. Calculate the message digest e=hash(msg), e.g. e=SHA256(SHA256(msg)).
2. Calculate the multiplicative inverse $s^{-1}$ of s modulo n.
3. Calculate $j_1=es^{-1}$ mod n and $j_2=rs^{-1}$ mod n.
4. Calculate the point $Q=j_1\cdot G+j_2\cdot P$.
5. If $Q=\mathcal{O}$, the point at infinity, the signature is invalid.
6. If $Q\neq\mathcal{O}$, then let $Q:=(Q_x, Q_y)$, and calculate $u=Q_x$ mod n. If u=r, the signature is valid.

In threshold signature schemes, this private key a is split into key shares that are distributed amongst participants in a threshold scheme group.

Joint Verifiable Random Secret Sharing

Assume that N participants want to create a joint secret that can only be regenerated by at least (t+1) of the participants in the scheme. To create the shared secret, the following steps are taken:

1. The participants agree on the unique label i for each participant. Each participant i generates (t+1) random numbers $$a_{ij} \in_R \mathbb{Z}_n\backslash\{0\},\ \forall\ j = 0, \ldots, t,$$

where $\in_R$ means a randomly generated element of the set $\mathbb{Z}_n\backslash\{0\}$ where $\mathbb{Z}_n\backslash\{0\}$ is notation for the set $\{1, \ldots, n-1\}$. Then each participant has a secret polynomial of order t $$f_i(x) = a_{i0} + a_{i1}x + \ldots + a_{it}x^t \bmod n,$$

for i=1, . . . , N. Note that we omit the mod n notation from now on, and it is assumed that all arithmetic operations over integers are done modulo n.

2. Each participant i sends the value $f_i(j)$ to participant j e.g. using a secure communication channel with participant j only.
3. Each participant i calculates their own private secret share of a shared secret polynomial as $$a_i := \sum_{j=1}^{N} f_j(i).$$

A shared secret share is a point with the form $(i, a_i)$, where i is the participants label in the scheme. This method for creating a secret share of a, as described in steps 1-3, is denoted herein by $a_i$=JVRSS(i) for participant i. Note that "JVRSS" typically stands for "Joint verification random secret sharing" and includes steps 4 and 5 as well. However, throughout this document JVRSS is taken to mean performing at least steps 1 to 3, where steps 4 and 5 are optional steps.

Now that the participants have generated a shared polynomial, they can each verify that the other participants have shared the correct information to all participants, and that all participants have the same shared polynomial. This is done in the following way.

4. Each participant i broadcasts to all participants the obfuscated coefficients $a_{ik}\cdot G$, for k=0, . . . , t.

5. Each participant i checks that each participant j has correctly calculated the polynomial point $f_j(i)$ by calculating $f_j(i)\cdot G$ and verifying that $$f_j(i)\cdot G \stackrel{?}{=} \sum_{k=0}^{t} i^k (a_{jk}\cdot G)\forall\ j = 1, \ldots, N.$$

If all participants find that this equation holds for each polynomial, then the group can collectively be sure that they have all created the same shared polynomial.

Reconstructing a Shared Secret

Assume a participant wants to reconstruct a shared secret a which is the zeroth order of a shared polynomial. Given (t+1) points on this polynomial of the form $$(1,a_1), \ldots, ((t+1),a_{t+1}),$$

then to find the shared secret a, one calculates $$\text{interpolate}(a_1, \ldots, a_{t+1}) = \left(\sum_{l=1}^{t+1} a_l \prod_{\substack{1\le j\le (t+1),\\ j\neq l}} (-j)(l-j)^{-1}\right) = a,$$

which is derived from a general formula known as "Lagrange Interpolation".

Public Key Calculation

Given the N zeroth-order private polynomial coefficient public keys $a_{i0}\cdot G$ for j=1, . . . , N shared in step 4 of JVRSS, each participant calculates the shared public key P using $$P = a\cdot G = \sum_{j=1}^{N} a_{j0}\cdot G,$$

corresponding to the shared secret a.

Addition of Shared Secrets

To calculate the addition of two shared secrets that are shared amongst a group of N participants, where each secret polynomial has order t, without any entity knowing the individual secrets, the following steps are taken:

1. Generate the first shared secret a, where participant i's share is given by $a_i$=JVRSS(i) for i=1, . . . , N with a threshold of (t+1).
2. Generate the second shared secret b, where participant i's share is given by $b_i$=JVRSS(i), with a threshold of (t+1).
3. Each participant i calculates their own additive share $$v_i = a_i + b_i \bmod n.$$

4. All participants broadcast their additive share $v_i$ to all other participants.
5. Each participant interpolates over at least (t+1) of the shares $v_i$ to calculate $$v = \text{interpolate}(v_1, \ldots, v_{t+1}) = a + b.$$

This method for the addition of shared secrets is denoted by ADDSS(i) for participant i, which results in each participant i knowing v=(a+b).

Product of Shared Secrets

To calculate the product of two shared secrets that are both shared amongst a group of N participants, where each secret polynomial has order t, the group takes the following steps:

1. Generate the first shared secret a, where participant i's share is given by $a_i$=JVRSS(i) for i=1, . . . , N. The shared secret polynomial has order t, meaning (t+1) participants are required to recreate it.
2. Generate the second shared secret b, where participant i's share is given by $b_i$=JVRSS(i), and the shared secret polynomial again has order t.
3. Each participant calculates their own multiplicative share $\mu_i$ using $$\mu_i = a_i b_i.$$

4. All participants broadcast their multiplicative share $\mu_i$ to all other participants.
5. Each participant interpolates over at least (2t+1) of the shares $\mu_i$ at 0 to calculate $$\mu = \text{interpolate}(\mu_1, \ldots, \mu_{2t+1}) = ab.$$

This method for calculating the product of two shared secrets is denoted herein by μ=ab=PROSS(i) for participant i.

Inverse of a Shared Secret

In order to calculate the inverse of a shared secret a, the following steps are taken:

1. All participants calculate the product of shared secrets PROSS(i), the result of which is $$\mu = ab \bmod n.$$

2. Each participant calculates the modular inverse of μ which results in $$\mu^{-1} = (ab)^{-1} \bmod n.$$

3. Each participant i calculates their own inverse secret share by calculating $$a_i^{-1} = \mu^{-1} b_i.$$

This method for calculating the inverse of shared secrets is denoted by $$a_i^{-1} = INVSS(i)$$

for participant i.

Shared Private Key Generation and Verification

To calculate a shared private key a between N≥2t+1 participants, t+1 of which are required to create a signature, the participants execute JVRSS with a threshold of t+1 and public key calculation as described above. The result is that every participant i=1, . . . , N has a private key share a; and the corresponding shared public key P=(a·G).

Ephemeral Key Shares Generation

To generate ephemeral key shares and the corresponding r, as is required in a signature, a group of size N with a shared private key a of threshold (t+1) execute the following steps:

1. Generate the inverse share of a shared secret $$k_i^{-1} = INVSS(i),$$

where (t+1) shares are required to recreate it. 2. Each participant calculates $$(x, y) = \sum_{i=1}^{N} (k_{i0} \cdot G),$$

using the obfuscated coefficients shared in the verification of $k_i$, then they calculate $$r = x \bmod n.$$

3. Each participant i stores $$(r, k_i^{-1}).$$

Non-Optimal Signature Generation

Assume that at least 2t+1 participants would like to create a signature on a message, and one of the participants chooses to coordinate this. In order to create a signature by a group with the shared private key a, the following steps are taken.

1. The coordinator requests a signature on the message from at least 2t+1 participants.
2. Each participant i recovers the ephemeral key $$(r, k_i^{-1})$$

calculated in the previous section. All users must use a share corresponding to the same ephemeral key.

3. Each participant calculates the message digest e=SHA-256(SHA-256(message)).
4. Each participant i calculates their own signature share $s_i$:

$$s_i = k_i^{-1}(e + a_i r) \bmod n,$$

where $a_i$ is their private key share.

5. Each participant sends their signature share (r, $s_i$) to the coordinator.

6. When the coordinator has received 2t+1 signature shares, they calculate:

$$s = \text{interpolate}(s_1, \ldots, s_{2t+1}),$$

and output the signature as (r, s).

7. The coordinator verifies the signature using the standard ECDSA verification. If this fails, at least one of the shares must be incorrect, and the signature generation algorithm should be run again.

Addition of Secrets with Different Thresholds

In the case of addition of secrets of order t and t', the addition of the two secrets requires max (t, t')+1 number of shares to calculate it. The reason behind this is that the addition step of the shares of the shared secrets creates a share of a new polynomial. This new additive polynomial is equivalent to the result of the addition of the individual polynomials of the two shared secrets. Adding two polynomials is adding the corresponding coefficients at each order of x. Therefore, the order of the additive polynomial must be the same order as the highest order of the two polynomials. This can be generalised to the addition of more than two polynomials, where the order of the resulting polynomial is the same as the order of the highest order individual polynomial.

Once the addition of two secrets with different thresholds has been calculated, the security of the higher threshold secret is reduced. This is because if one now knows the result (a+b) with respective thresholds t, t' and assume that t<t', then one can calculate a with t shares, and then calculate (a+b)−a=b, and so the value b has been calculated with only t shares. This lower threshold is referred to below as the 'implicated threshold' of b.

Multiplication of Secrets with Different Thresholds

In the case of multiplication of two secrets with a threshold of t and t', the calculation of the multiplication requires t+t'+1 shares. In this case, the multiplication of shares of two polynomials results in a share on a new polynomial. This new polynomial is the result of multiplying the two individual polynomials and so the order of the result is the addition of the order of the two individual polynomials.

Multiplication can also be generalised to any number of shared secrets, with the resulting threshold being the sum of the individual thresholds plus 1, $\Sigma_\rho t_\rho+1$, where ρ runs over the individual shared secrets.

Similar to addition, the multiplication of two secrets with different thresholds results in an implicated threshold of the higher threshold secret. As before, if ab is known where a has a threshold of t and b has a threshold of t', and t<t', then both a and b can be calculated with t shares. First, one can calculate a and using $(ab)a^{-1}$ find b with only t shares of a secret.

Combining the Addition and Multiplication of Shared Secrets in One Step

It is possible to generalise the above to calculate any combination of addition and multiplication in one step. Assume a group of N participants want to calculate the result ab+c, where a, b, c are shared secrets with thresholds $(t_a+1)$, $(t_b+1)$, $(t_c+1)$ respectively. There is a condition which is max $(t_a+t_b, t_c)<N$, that is, the number of participants of the scheme must be greater than the maximum between the order of the secret c and the order of the result of the multiplication of the secrets a and b.

1. Each participant i calculates their secret shares $a_i$=JVRSS(i), $b_i$=JVRSS(i), $c_i$=JVRSS(i) with thresholds $(t_a+1)$, $(t_b+1)$, $(t_c+1)$ respectively.
2. Each participant i calculates the share $\lambda_i=a_ib_i+c_i$.
3. Each participant i shares the result $\lambda_i$ with the other participants.
4. Each participant interpolates over $\max(t_a+t_b, t_c)+1$ shares to find the result $\lambda=\text{int}(\lambda_1, \ldots, \lambda_i, \ldots)=ab+c$.

This is done in the calculation of a shared signature according to some embodiments below. That is, there is an interpolation over $$s_i = k_i^{-1}(e + a_i r).$$

This is essentially the case above with $$a_i b_i = k_i^{-1} a_i r \text{ and } c_i = k_i^{-1} e.$$

In this case $t_a+t_b=2t$ and $t_c=t$, and interpolation is over $\max(t_a+t_b, t_c)+1=2t+1$ shares.

HD Wallets

Figure 2:
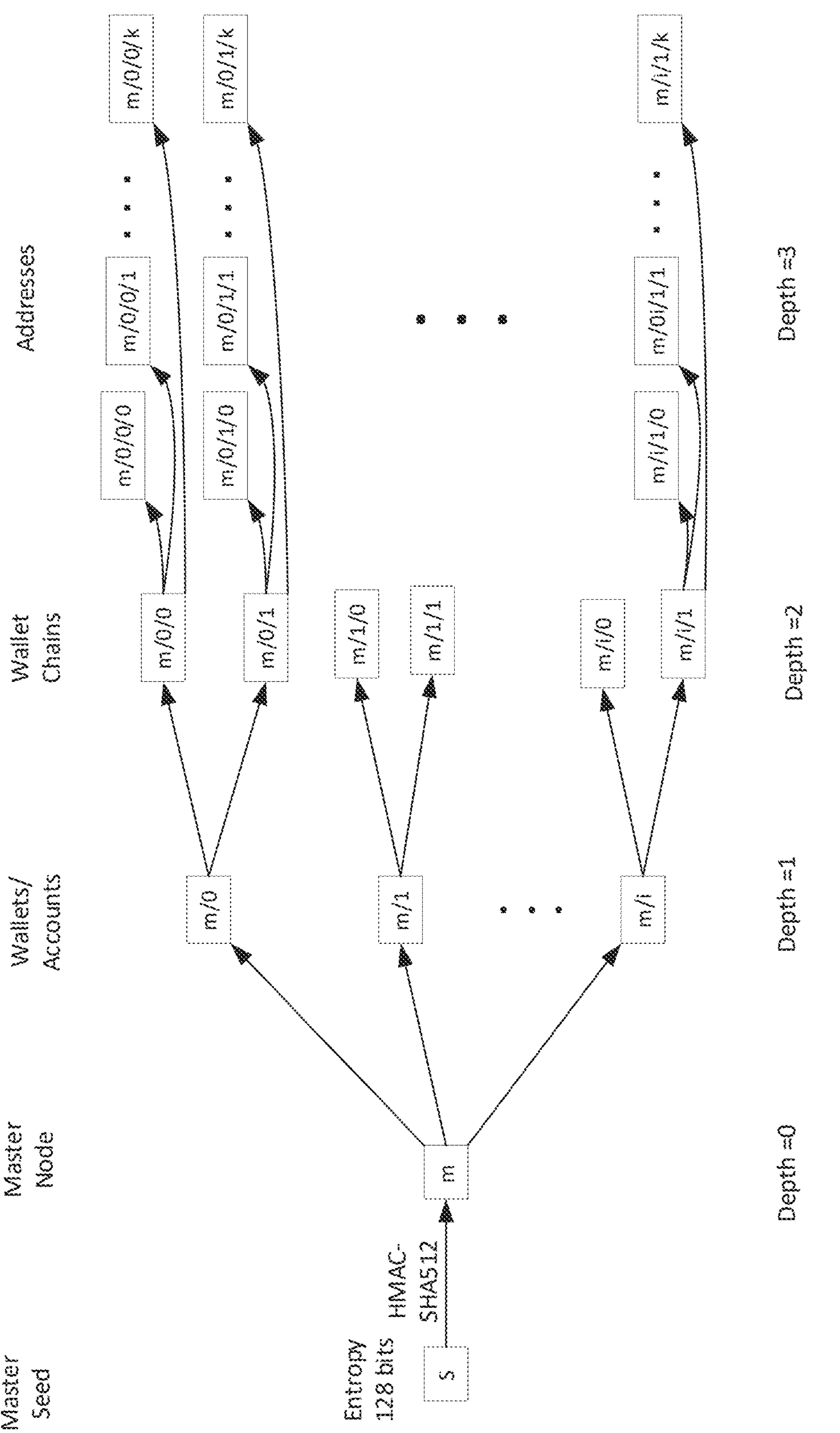

Hierarchical Deterministic wallets, of which a Bitcoin Improvement Proposal 32 (BIP32) wallet is a particular type, are deterministic wallets where many keys can be derived from a single input. The input is some random entropy called the seed, from which a master key is derived. The master key is then used to derive multiple child keys, as shown in FIG. 2.

In BIP32 the master private key is the left 32 bytes of the result of the HMAC-SHA512 of the seed, or explicitly, it is $$sk_{master} = HMAC\text{-}SHA512_L(\text{'Bitcoin Seed'}, \text{seed}),$$

and the chain code is $$c_{master} = HMAC\text{-}SHA512_R(\text{'Bitcoin Seed'}, \text{seed}),$$

and all child keys can be then derived from these, where $$HMAC\text{-}SHA512(c, K) = SHA512(c \oplus opad \| SHA512((c \oplus ipad) \| K))$$

is the HMAC using the SHA512 hash function. In the equation above, opad is the block-sized outer padding, and ipad is the block-sized inner padding.

A HMAC requires two inputs, i.e. c and K. For simplicity and so that users are only required to remember or store a single seed, the BIP32 protocol sets the first input as the string 'Bitcoin Seed', i.e. c='Bitcoin Seed' It will be appreciated that this is one example protocol for generating a HD wallet and that different protocols may require different inputs, e.g. two randomly generated seeds. In other words, the use of the string 'Bitcoin Seed' is not a necessary requirement for generating a HD wallet.

The equation for calculating a hardened child private key $sk_{child}$ from a parent private key $sk_{parent}$ is $$sk_{child} = sk_{parent} + HMAC{-}SHA512_L(c_{parent}, sk_{parent} \| \text{index}),$$

where $c_{parent}$ is the parent chain code, $0 \le \text{index} < 2^{31}$ is the child index, and HMAC-SHA512_is the left 32 bytes of the result of the HMAC function calculated with the SHA-512 hash function. The corresponding equation for the child public key is derived by simply point multiplying this equation by the base point G.

The equation for calculating a non-hardened child private key $sk_{child}$ from a parent public key $pk_{parent}$ and parent private key $sk_{parent}$ is $$sk_{child} = sk_{parent} + HMAC{-}SHA512_L(c_{parent}, pk_{parent} \| \text{index}),$$

where $c_{parent}$ is the parent chain code, $2^{31} \le \text{index} < 2^{32}$ is the child index, and HMAC-SHA512 is the HMAC function calculated with the SHA-512 hash function. This second type of child key allows for child public keys to be derived by anyone with knowledge of the parent public key and chain code using the equation $$pk_{child} = pk_{parent} + HMAC{-}SHA512_L(c_{parent}, pk_{parent} \| \text{index}) \cdot G.$$

This can be used by external parties to derive various payment addresses as required, avoiding key reuse, whilst reducing rounds of communication and storage.

In general, an HD wallet should generate some hierarchical tree-like structure of private-public key pairs. This provides a high number of key pairs that can all be regenerated from one seed.

Generating Private Key Shares

FIG. 1 illustrates an example system 100 for implementing embodiments of the invention. As shown, the system 100 comprises a plurality of parties (also referred to below as "participants") 102. Only three participants 102 are shown in FIG. 1, but it will be appreciated that in general the system may comprise any number of participants. Each of the participants 102 operates respective computing equipment.

Each of the respective computing equipment of the respective participants 102 comprises respective processing apparatus comprising one or more processors, e.g. one or more central processing units (CPUs), accelerator processors such a graphics processing units (GPUs), other application specific processors, and/or field programmable gate arrays (FPGAs). The respective computing equipment may also comprise memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive. The respective computing equipment may comprise at least one user terminal, e.g. a desktop or laptop computer, a tablet, a smartphone, or a wearable device such as a smartwatch. Alternatively or additionally, the respective computing equipment may comprise one or more other networked resources, such as cloud computing resources accessed via the user terminal (the cloud computing resources comprising resources of one or more physical server devices implemented at one or more sites). It will be appreciated that any act described as being performed by a party of the system 100 may be performed by the respective computing apparatus operated by that party.

Each of the participants 102 is configured to transmit data to one, some or all of the other participants 102 over the internet using a LAN or WAN connection, or via alternative wired or wireless communication means. Unless the context requires otherwise, reference to a participant 102 transmitting data may be understood as transmitting data to other participants 102 individually, e.g. via a secure communication channel between the first participant 102*a* and the second participant 102*b*, or broadcasting to the group as a whole, e.g. via email or other means. Again, unless the context requires otherwise, each participant 102 may transmit data in raw form, or in encrypted form. For instance, the data may be encrypted using a public key of a recipient participant before being sent to that recipient participant.

Embodiments of the present invention will primarily be described from the perspective of the first participant 102*a*. However it will be appreciated that in general steps of the described method may similarly be performed by other participants, e.g. the second participant 102*b* or third participant 102*c*. It will also be appreciated that the terms "first", "second", "third" and so on are used herein merely as distinguishing labels and do not necessarily imply an order, unless the particular context in which the terms are used requires otherwise.

The present invention enables each participant 102 of a group of participants 102 to generate respective shares of one or more shared private keys that are each linked to a shared master private key. That is, each participant can generate, and therefore own, a share of a master private key, and then use the master private key share to derive shares of additional private keys, e.g. to generate a shared wallet.

The first participant 102*a* obtains, e.g. generates or receives, a first seed share. As set out above, "first" is used here merely as a label. A "seed share" may be an integer or string, that is preferably only known to the first party 102*a*. The seed share may be randomly or pseudorandomly generated. It is also not excluded that the seed share is previously known to the first party 102*a*. Whilst referred to a share, preferably the participants respective seed shares are not shares (i.e. components) of a common seed, although that it is not excluded. The second participant 102*b* and third participant 102*c* also obtain a respective seed share, e.g. the second participant 102*b* generates a second seed share 102*b*.

The first participant 102*b* generates a first master private key share, i.e. a share of a shared master private key. The first master private key share is generated based on, i.e. is a function of, the first seed share (i.e. the first participant's share) and the respective seed share of each other participant. E.g. following on from the above example, the first master private key share is generated based on each of the first, second and third seed shares. Similarly, the second participant 102*b* and third participant 102*c* generate a second master private key share and a third master private key share respectively.

Having generated the first master private key share, the first participant 102*a* generates one or more first private key shares, wherein each first private key share is a share of a different shared private key. Again, "first" is used as a label to refer to private key shares that are generated based on, i.e. a function of, the master private key share. There may be many different "first private key shares". Each other participant, e.g. the second participant 102*b* and third participant 102*b*, may also generate respective shares of the shared private keys. The private key shares (e.g. the first master private key share and each of the first private key shares) may be generated at once together, or they may be generated as and when required. Similarly, each of the generated private key shares may be stored together or separately. One or more of the generated private key shares may be deleted after use.

In some embodiments, the first participant 102*a* may generate a first data item based on, i.e. as a function of, the first seed share. Generating the first data item may comprise applying a hash function to at least the first seed share to generate a first component of the first data item, i.e. the first component is some or all of the hash of at least the first seed share. Any hash function may be used, e.g. SHA256, SHA512, etc. In some examples a hash function that performs more than one hashing operation could be used, such as a double-hash, e.g. SHA256 followed by SHA256. The other participants similarly generate a respective data item, e.g. the second participant 102*b* generates a second data item and the third participant 102*c* generates a third data item. The first participant 102*a* obtains, e.g. receives, the other data items and generates the first master private key share based on, i.e. as a function of, the first data item and the other data items. The other participants generate their respective master private key shares in a similar way.

Preferably the hash function is a hash-based message authentication code (HMAC) function. In these examples, since a HMAC function requires two inputs, the first participant 102*a* inputs both the first seed share and another input into the HMAC. The other input may be a different seed share, the same seed share, or data known to each participant, e.g. a known integer or string. In these examples, the first component may be the entire output of the HMAC function, or a part of the output, e.g. the left 256 bytes.

The respective master private key shares may be generated using a secret sharing scheme. That is, each participant 102 participates in a secret sharing scheme to generate a respective share of a shared secret. For instance, the secret sharing scheme may be a joint verifiable secret sharing scheme (JVRSS) or a Shamir's secret sharing scheme (SSSS), or a different scheme. For instance, and as described above, in JVRSS each participant generates t+1 random numbers $a_{ij}$, and then uses those numbers as coefficients of a polynomial of order t. Now, for the present invention, the first participant may set the value $a_{i0}$ to be the "first component", e.g. some or part of the hash of the first seed. The "first data item" is then $f_i(x)=a_{i0}+a_{i1}x+\ldots+a_{it}x^t \bmod n$, and the first master private key share is $$a_i := \sum_{j=1}^{N} f_j(i),$$

where N is the number of participants. Whilst JVRSS is an example of a dealer-less scheme which may be used to share secrets, a scheme with a dealer (e.g. a trusted third party) may also be utilized to generate the master private key shares.

The concept of HD key structures (or HD wallets) is introduced above. The first participant 102*a* may generate a HD key structure of private key shares, where each private key share is ultimately derivable from the first master key share. The HD key structure may comprise multiple levels of parent private key shares and/or child private key shares. Some private key shares may be both a parent to a respective child private key share, and a child of a respective parent private key share.

Before describing how the HD key structure may be generated, an example method for generating the master private key shares $a_{i\text{-}master}$ is provided. This particular example derives the master key $a_{master}$ using JVRSS, defining the master private key as $$a_{master} = \sum_{i=1}^{N} HMAC\text{-}SHA512_L(\text{'Bitcoin Seed of participant } i\text{'}, \text{seed}_i)$$

where $\text{seed}_i$ is the seed of participant i may come from a branch of a participant's personal BIP32 wallet. No single participant knows this result, instead the participants have shares of this $a_{i\text{-}master}$ calculated using JVRSS. This is achieved by defining the $a_{i0}$ in step 1 of JVRSS as:

$$a_{i0} = HMAC\text{-}SHA512_L(\text{'Bitcoin Seed of participant } i\text{'}, \text{seed}_i),$$

instead of random values as in the usual JVRSS. The right half of the result of the HMAC will be the corresponding chain code of participants i seed.

$$c_{i\text{-}master} = HMAC\text{-}SHA512_R(\text{'Bitcoin Seed of participant } i\text{'}, \text{seed}_i)$$

At this point, the participants 102 have secret shares of the private master key $a_{i\text{-}master}$, and individual chain codes $c_{i\text{-}master}$ corresponding to the seed i. Because participants 102 have shares $a_{i\text{-}master}$ with some threshold, if any of the shares are lost, the key is still recoverable. In the unlikely event that all the shares are lost, the keys can be rederived using the seed from each participant i.

Options for generating the first private key shares based on the first master private key share will now be described. One option involves the use of a set of auxiliary private keys, e.g. an auxiliary HD key structure or auxiliary wallet. The first participant 102*a* may use an existing set of auxiliary private keys or generate a new set. Then, each first private key share is generated by based on, i.e. is a function of, the first master private key share and a respective one of the set of auxiliary private keys. For example, the first participant 102*a* may use a HD key structure comprising auxiliary private keys at different levels and/or positions of the structure to generate a shared HD key structure (or shared wallet), wherein the shared HD key structure comprises shares of private keys at corresponding levels and/or positions. E.g. a share of a parent private key in the shared HD key structure may be generated based on an auxiliary parent private key at a corresponding position in the auxiliary key structure. Similarly, a share of a child private key in the shared HD key structure may be generated based on an auxiliary child private key at a corresponding position in the auxiliary key structure.

Each other participant 102 may similarly generative respective shares of the same shared private keys using the same auxiliary private keys and their respective master private key share. In order to do so, each participant requires the same auxiliary private keys(s). In some examples, each participant 102 uses a common master auxiliary private key that is known to each participant, and derives any other required auxiliary private key from the master auxiliary private key.

In some examples, each participant uses a common seed to derive the auxiliary master private key. The common seed may be generated by one participant, e.g. the first participant 102*a*, and shared with the other participants 102. Alternatively, the common seed may be collectively generated using a secret sharing scheme, e.g. JVRSS or SSSS. The common seed may be generated based on a first shared secret (e.g. the shared master private key) and a second shared secret (e.g. a blinding or obfuscation key). That is, each participant has a respective share of a first shared secret and a respective share of a second shared secret. Each participant combines their two respective shares to generate a respective "combined share". The participants may share their respective combined shares with each other participant 102, i.e. the first participant 102*a* obtains a respective combined share from each other participant 102. The combined shares may then be combined, e.g. interpolated over, to generate the common seed from which the auxiliary master private key is generated. If the shared secrets are threshold secrets, rather than needing a respective common share from each other participant, the first participants 102*a* only needs a threshold number of common shares in order to generate the common seed.

The auxiliary master private key may be generated by applying a hash function to at least the common seed. The hash function may be a HMAC function, in which case both the common seed and an additional seed are input to the HMAC function. The auxiliary master private key may be a part of the HMAC output, e.g. the left 256 bytes.

These embodiments may be used to generate a shared HD wallet, e.g. a shared BIP32 wallet. For instance, a separate BIP32 wallet may be used to derive keys $sk_{parent}$, $sk_{child}$ etc., that are added to the key shares $a_{i\text{-}master}$. The master private key $sk_{master}$ is derived from a seed as usual and is known to every participant. The master private key is not used in the calculation of new key shares, but the first child keys derived from the master key $sk_{master}$ may be used, labelled below as $sk_{parent}$. A private child key share is defined as $$a_{i-child} = a_{i-master} + sk_{parent},$$

and grandchild keys will be $$a_{i\text{-}grandchild} = a_{i\text{-}master} + sk_{child},$$

where $sk_{child}$ is derived from $sk_{parent}$ as a usual BIP32 child key, and so on. This implies that the full child private key (which preferably never exists) would be $$a_{child} = a + sk_{parent}$$

and an equivalent equation for the grandchild key. These keys will be defined as hardened or non-hardened depending on whether the auxiliary wallet key is hardened or non-hardened.

One option with this wallet is to have the value $sk_{master}$ to be the blinded private key $a+\rho$, and derive all further child keys from this, relating it to the shared private key a without any single party knowing a explicitly. Explicitly, the steps for this are 1. Participants execute two rounds of JVRSS, one corresponding to the shared private key a and the other corresponding to a blinding secret $\rho$. Each participant i has a corresponding private key share $a_i$ and blinding secret share $\rho_i$.
2. Each participant i calculates the addition of their secret shares $a_i+\rho_i$ and broadcasts this to the other participants.
3. Each participant interpolates over at least t+1 addition shares to find $a+\rho$.
4. This result is used as the seed in $sk_{master}$ such that $$sk_{master} = HMAC\text{-}SHA512_L(\text{'Bitcoin Seed'}, a, \rho)$$

and the chain code is $$c_{master} = HMAC\text{-}SHA512_R(\text{'Bitcoin Seed'}, a+\rho),$$

which are used to derive $sk_{parent}$ keys and used in the equation as described above. The method of adding a secondary key that is a normal BIP32 wallet key requires no additional rounds of communication as the necessary information can be shared alongside the set-up of the shared secret.

Another option for generating the first private key shares based on the first master private key share involves the use of hash (e.g. HMAC) functions. This option is particularly suited for generating a shared HD key structure. As shown in FIG. 2, each private key in HD key structure has a parent private key. The parent of the private keys in a first level in the HD key structure may be the master private key, where the master private key is at the zeroth level.

A shared HD key structure may be generated, where each private key share (i.e. a child key share) is generated based on a respective parent private key share and an index assigned to the child private key share. The index designates the position of the key in the tree. Each child private key share may also be generated based on a respective chain code of the respective parent private key share. More specifically, each child private key share may be generated based on a first term and a second term. The first term is generated based on, i.e. is a function of, the parent private key share. In some examples, the first term may be the parent private key share. The second term is generated by inputting at least the parent private key share or a corresponding public key into a hash function. Also input to the hash function is an index of the child private key share that is being generated. In some examples, the parent private key share and the index may be concatenated.

A child private key that is generated by inputting the parent private key to the hash function is sometimes referred to as a "hardened child private key". Similarly, a child private key share that is generated by inputting the parent private key share to the hash function is referred to below as a "hardened child private key share". In contrast, a child private key that is generated by inputting a public key corresponding to the parent private key into the hash function is sometimes referred to as a "non-hardened child private key". Similarly, a child private key share that is generated by inputting a public key corresponding to the parent private key share into the hash function is referred to below as a "non-hardened child private key share".

The hash function may be a HMAC function. A child private key share may be generated based on a first part of the HMAC output, e.g. the left 256 bytes if the HMAC uses the SHA256 hash function.

A chain code share of the parent private key share may also be input to the hash function, e.g. if the hash function requires two separate inputs. The purpose of the chain code is to add more entropy into the derivation of child keys. For a given private key share, the chain code share for that private key share may be a second part of the HMAC output. E.g. the chain code share may be the right 256 bytes. The chain code share of a given private key share (call it a "target key share") is based on the parent private key share, the index of the target key share and the chain code share of the parent private key share.

The examples above derive child private keys using parent private key shares or public keys corresponding to the parent private key shares. Child private key shares may also be generating using a master public key, or more generally a parent public key. That is, using a public key corresponding to the full master private key or full parent private key, rather than the public key corresponding to a private key share. In these instances, a chain code for the full private key does not exist since the full private key itself does not exist, i.e. no participant knows the full private key. Each participant 102 may therefore use a common chain code for each child private key share that is derived in this way. That is, the participants 102 may agree upon a common chain code to use. The common chain code may be generated based on, e.g. may comprise a sum of, the respective parent chain code shares of the respective parent private key shares corresponding to the full parent private key. As an example, the first participant 102 may obtain a master chain code share corresponding from each participant and use them, along with the first master chain code share of the first master private key share, to generate a common chain code. Then, when generating the first child private key share, the second term is generated by inputting into the hash function (e.g. HMAC function) the common chain code, a public key corresponding to the parent private key and a respective index of the first child private key share. The public key and index may be concatenated. Since these child key shares are derived using a public key they are referred to as "non-hardened key shares".

The following provides further details on how to generate child private key shares and corresponding public keys.

Hardened child keys may be derived using a sum of individual BIP32 terms $$a_{child} = a_{parent} + \sum_{j=1}^{N} HMAC\text{-}SHA512_L(c_{j\text{-}parent}, a_{j\text{-}parent} \,||\, \text{index}).$$

Then grandchild keys would be $$a_{grandchild} = a_{child} + \sum_{j=1}^{N} HMAC\text{-}SHA512_L(c_{j\text{-}child}, a_{j\text{-}child} \,||\, \text{index}),$$

and so on. Note that the full private keys themselves are not actually generated.

The second term in these equations is calculated using JVRSS where the constant term of participant i's secret polynomial is HMAC-SHA512; $(c_{i\text{-}parent}, a_{i\text{-}parent} \| \text{index})$. Then after calculating the share corresponding to this JVRSS labelled $a_{i\text{-}HMAC_L(parent)}$, they can simply add the share to their old share $a_{i\text{-}parent}$ that the new share is $$a_{i\text{-}child} = a_{i\text{-}parent} + a_{i\text{-}HMAC_L(paremt)}.$$

There is an equivalent relation for grandchild keys, and so on. Interpolating over this result would result in the child key above. By deriving the child keys in this way, even if a key is compromised, the child keys cannot be calculated, which is even more secure than a usual BIP32 wallet.

The following describes two methods for generating non-hardened child key shares. The first method is similar to the method described above for generating hardened keys. There is a drawback that the individual public keys corresponding to key shares must be shared, but this can be done at the same time as the corresponding chain code(s), and so there is no additional communication in any case. The second method resolves this issue of needing to share more information, and can be calculated by any external party with knowledge of the public key and chain code as in the usual BIP32 wallet.

In the first method, each participant in a shared secret scheme derives their child private key share using the equation $$a_{i\text{-}child} = a_{i\text{-}parent} + \sum_{j=1}^{N} HMAC\text{-}SHA512_L(c_{j\text{-}parent}, (a_{j\text{-}parent} \cdot G) \,||\, \text{index}).$$

The pair $(a_{i\text{-}child}, a_{child} \cdot G)$ can be used in the same way as the shares $(a_i, a \cdot G)$ in a shared secret scheme. For external parties wanting to derive the corresponding public key $$a_{child} \cdot G = a_{parent} \cdot G + \sum_{j=1}^{N} HMAC\text{-}SHA512_L(c_{j\text{-}parent}, (a_{j\text{-}parent} \cdot G) \,||\, \text{index}) \cdot G,$$

the additional information $c_{j\text{-}parent}$ and $(a_{j\text{-}parent} \cdot G)$ must be shared initially. After the first iteration, they can calculate this information themselves.

In the second method, when considering the derivation of the first child key there is no single chain code $c_{parent}$ due to the derivation of the master key. In this case $c_{parent}$ is defined to be $$c_{parent} = \sum_{i=1}^{N} c_{i\text{-}parent}.$$

The participants add their individual chain codes to get the first parent chain code. After the first non-hardened child keys are derived, the chain code reverts to the normal definition.

Each participant in the scheme then derives their child private key share using the equation $$a_{i\text{-}child} = a_{i\text{-}parent} + HMAC\text{-}SHA512_L(c_{parent}, a_{parent} \cdot G \,||\, \text{index})$$

and the child public key can be calculated by external parties using $$a_{child}\cdot G=a_{parent}\cdot G+HMAC\text{-}SHA512_L(c_{parent},\ a_{parent}\cdot G\parallel \text{index})\cdot G$$

Figure 3:
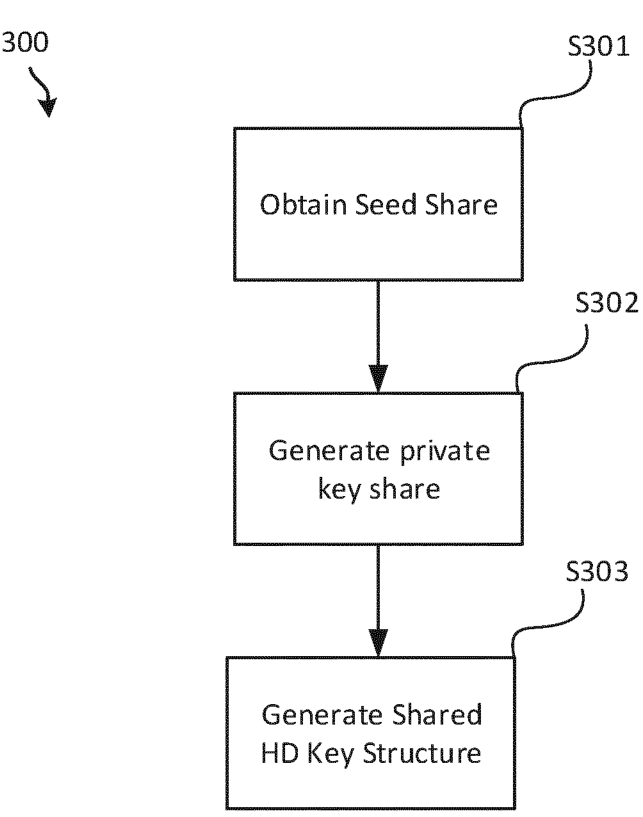
FIG. 3 is a flow diagram illustrating an example embodiment of the present invention.

FIG. 3 shows an example method 300 according to some embodiments of the present invention. At step S301 the first participant 102$a$ obtains a seed share. At step S302 the first participant 102$a$ generates a first master private key share based on the first seed share. At step S303 the first participant 102$a$ generates a HD key structure based on the first master private key share.

The private key shares (e.g. parent private key shares of child private key shares) that are generated based on the master private key share may be used as part of a signature scheme to sign a message, and/or as part of an encryption scheme to encrypt a message, or for a different purpose.

For instance, when used as part of a signature scheme, the first participant 102$a$ may use a first private key share to generate a first signature share for a message. The second participant 102$b$ may similarly generate a second signature share for the message, and similarly the third participant 102$c$ may generate a third signature share. The first, second and third signature shares may be used to generate a full signature. The signature scheme may be a threshold signature scheme in which case only a threshold number of signature shares may be required to generate a signature.

Figure 4:
FIG. 4 is a flow diagram illustrating an example signature generation method according to some embodiments of the present invention.
Figure 4:
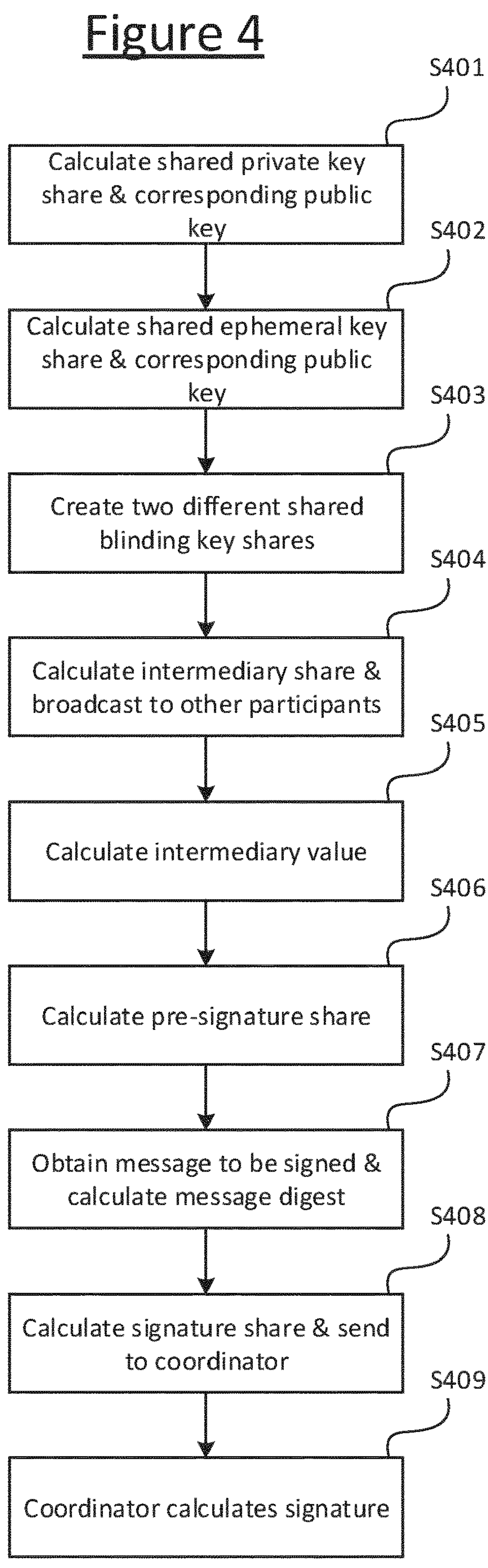

FIG. 4 illustrates an example method 400 for generating a signature on a message according to embodiments of the invention. Steps S401 to S408 are performed by each of a threshold number of participants 102 in this example (including the first participant 102$a$). Step S409 is performed by a coordinator 101, who may also may one of the participants performing steps S401 to S408. It will be appreciated that some of the steps may be omitted or be performed in a different order.

The example method 400 enables the creation of a shared secret of threshold (t+1) in a group of N≥2t+1 participants, where the signing threshold is also (t+1).

Set-Up:

In step S401, each participant 102 calculates a child private key share $a_{i\text{-}child}$ and a corresponding public key. The generation of the child private key share $a_{i\text{-}child}$ has been described above. At this point, each participant i has a secret child key share and public key ($a_{i\text{-}child}$, P), where P is notation for the public key corresponding to the shared private key, i.e. $a_{child}\cdot G$. The shared private key has a threshold of (t+1).

Pre-Calculation:

In step S402, each participant 102 calculates a shared ephemeral key share and a corresponding public key. For instance, each participant 102 may calculate a shared ephemeral key using JVRSS and the calculation of the public key given in the preliminaries. Each participant 102 may then calculate an inverse share based on the ephemeral private key. This results in each participant having an inverse share $$(k_i^{-1},\ r),$$

with a threshold of (t+1).

In step S403, each participant 102 creates two different shared blinding key shares. For instance, each participant 102 may create two shared secrets so that participant i has shares $\alpha_i$=JVRSS(i) and $\beta_i$=JVRSS(i), each shared secret having a threshold (t+1). Note that in some examples, not all of the shared secrets need to have the same threshold.

In step S404, each participant 102 calculates an intermediary share and broadcasts their intermediary share to the other participants. For instance, each participant i may calculate the intermediary share $$\lambda_i=k_i^{-1}a_{i-child}+\beta_i.$$

This value has a threshold of (2t+1).

In step S405, each participant 102 calculates an intermediary value based on at least the intermediary shares. For instance, each participant 102 may calculate the intermediary value using interpolation over (2t+1) shares $\lambda$=interpolate($\lambda_1$, . . . , $\lambda_{2t+1}$)=$k^{-1}a+\beta$.

In step S406, each participant 102 calculates a pre-signature share. For instance, each participant i may calculate their pre-signature share $\sigma_i=1-\beta_i=(k^{-1}a+\beta)-\beta_i$. Each participant 102 may store $$(r,\ k_i^{-1},\ \sigma_i),$$

and the private key share and corresponding public key ($a_{i\text{-}child}$, P).

Note that since a different ephemeral key is used for each signature, multiple ephemeral keys can be set up at one time, that is, steps S402 to S406 can be repeated to create multiple ephemeral keys during pre-calculation and stored for later use. These can be executed at the same time so that there are no additional rounds of communication. Note that preferably, a different value of $\alpha$ and $\beta$ should be used for each signature.

Signature Generation:

In order to sign a message msg, at least (t+1) participants must perform steps S407 and S408.

In step S407, at least the threshold number of participants 102 obtain a message to be signed and calculate a message digest. For instance, a coordinator 101 may send a request to (t+1) participants to create a signature share on the message msg. Each participant i may calculate the message digest e=hash(msg). In some examples, this hash function is the double SHA-256 hash function. Alternative hash functions may be used.

In step S408, at least the threshold number of participants 102 calculate a signature share and send it to the coordinator 101. For instance, each participant i may calculate their signature share $$s_i=k_i^{-1}e+r\sigma_i,$$

and then send their signature share (r, $s_i$) to the coordinator. Note that the value r may not be sent by all participants.

In step S409, the coordinator 101 calculates the signature. For instance, the coordinator 101 may calculate s=interpolate ($s_1$, . . . , $s_{t+1}$)=$k^{-1}$(e+ar), and finally the signature (r, s).

There are several alternatives for pre-calculating the message independent component of the signature share. These can broadly be split into two sets of variations: when to include r in the calculation, and when to include $(k\alpha)^{-1}$. These can be selected independent of each other and so there are eight variations to the above method 400.

One modification is to store $$(r, k_i^{-1}, r\sigma_i)$$

during step S406, meaning that r is included in the pre-signature share. Another modification is that the multiplication with r can also come earlier during the calculation of the intermediary shares. By defining instead $\Delta_i=$ $$rk_i^{-1}a_{i-child}+\beta_i$$

in step S404, then in step S406, $\sigma_i=\lambda-\beta_i=(rk^{-1}a+\beta)-\beta_i$ and the calculation of signature shares is $$s_i=k_i^{-1}e+\sigma_i.$$

Another modification is to instead calculate $\lambda_i=\alpha_i a_{i-child}+\beta_i$ such that $\lambda=(k\alpha)^{-1}(\alpha a+\beta)$, and $\sigma_i=\lambda—(k\alpha)^{-1}\beta_i$. The two variations of including r at alternative points can be done in combination with this. Each participant has knowledge of ka as it is calculated in step S402 of the pre-calculation. Additionally, all participants 102 broadcast their $\lambda_i$ share. So each participant 102 has knowledge of (at least) 2t+1 shares and the value $k\alpha$. They can then calculate $$\lambda=(k\alpha)^{-1}\times\text{interpolate}(\lambda_1, \ldots, \lambda_{2t+1})$$

Another modification is to instead calculate the intermediary value as $\lambda=(\alpha a+\beta)$ and the pre-signature share as $\sigma_i=\lambda-\beta_i$. Finally, the signature share would then be $$s_i=k_i^{-1}e+r(k\alpha)^{-1}\sigma_i.$$

The two variations of when to include r in the calculation can also be done in combination with this. Each participant 102 has knowledge of $k\alpha$ from the calculation of $$k_i^{-1}.$$

They can then calculate $(k\alpha)^{-1}$ mod n with this, and then include it in the calculation of $s_i$.

In summary, each participant 102 may generate four secret shares: $a_{i-child}$, $k_i$, $\alpha_i$, $\beta_i$. Two products need to be calculated in the example method 400: $k\alpha$ which is then used to calculate $$(ka)^{-1}a_{i-child}=k_i^{-1}$$

(interpolation over these shares gives $k^{-1}$ as the $\alpha$'s will cancel, and $k^{-1}a$ for use in the signature, which uses the first product, and so if the shares are expanded, the calculated gives $$k_i^{-1}a_{i-child}=(k\alpha)^{-1}\alpha_i a_{i-child}.$$

Any calculations with the $$k_i^{-1}$$

share, which is made of $k\alpha$ and $a_{i-child}$, can be done by doing the calculation just with $\alpha_i$ itself first, and then multiplying by $(k\alpha)^{-1}$ where necessary.

One version of the above scheme can be summarised by saying that a signature is calculated using shares that are composed of a message independent component (MIC) and a message dependent component (MDC), where the MIC may be based on the pre-signature share oi and the MDC is based on the message e.

An equivalent scheme comprises calculating the MIC as above, and then incorporating this in the signature along with the signature shares, e.g. after interpolation of the signature shares which are made of just an MDC. Explicitly, the scheme may be same up to step S406 of the pre-calculation, where the intermediary shares include the r value, $\lambda_i=$ $$k_i^{-1}a_{i-child}r+\beta_i$$

such that after interpolation this is $\lambda=k^{-1}ar+\beta$.

At this stage, the participants have knowledge of $$(r, k_i^{-1}, \lambda, \beta_i)$$

and store this along with the private key share and corresponding public key ($a_{i-child}$, P).

Then in order to generate their signature share on a given message m which is hashed to create the message digest e=hash(m), the participants calculate $$s_i=k_i^{-1}e-\beta_i,$$

and send this to a coordinator. The coordinator then calculates $$s=\text{interpolate}(s_1, \ldots, s_{t+1})+\lambda,\ =k^{-1}e+k^{-1}ar,$$

resulting in the expected signature share since the $\beta$ terms cancel. Similar variations of this protocol can be made as above describing when the $(k\alpha)^{-1}$ and r is included in the calculation.

The following variations for calculating the message-independent component may be implemented:

i) Calculate $\lambda=k^{-1}a+\beta$, then the signature shares are now $$s_i = k_i^{-1}e - r\beta_i,$$

and the signature is generated as $s=\text{int}(s_1, \ldots, s_{t+1})+r\lambda$.

ii) Calculate $\lambda=\alpha ar+\beta$, then the signature shares are now $s_i=\alpha_i e-\beta_i$, and the signature is generated as $s=(k\alpha)^{-1}(\text{int}(s_1, \ldots, s_{t+1})+\lambda)$.

iii) Calculate $\lambda=\alpha a+\beta$, then the signature shares are now $$s_i = k_i^{-1}e - r\beta_i,$$

and the signature is generated as $s=(k\alpha)^{-1}(\text{int}(s_1, \ldots, s_{t+1})+r\lambda)$.

iv) Calculate $\lambda=\alpha ar+\beta$, then the signature shares are now $$s_i = k_i^{-1}e - (k\alpha)^{-1}\beta_i,$$

and the signature is generated as $s=(\text{int}(s_1, \ldots, s_{t+1})+(k\alpha)^{-1}\lambda)$.

v) Calculate $\lambda=\alpha a+\beta$, then the signature shares are now $$s_i = k_i^{-1}e - r(k\alpha)^{-1}\beta_i,$$

and the signature is generated as $s=(\text{int}(s_1, \ldots, s_{t+1})+r(k\alpha)^{-1}\lambda)$.

Note that the thresholds of the secrets may be different. That is the threshold of $a_{child}$, k, α, β themselves do not necessarily need to be the same to execute the signature generation scheme. For example, if there is a group of six and three are needed to create the signature and/or private key, they could technically do the calculation with the threshold of the k being four and the thresholds of the other shared secrets being three, and they will still have a threshold-optimal scheme.

Note that the present invention may be applied to any threshold signature scheme (whether optimal or non-optimal) and is not limited to the particular scheme described above.

In general, embodiments of the present invention can be used to generate a signature on any message. As a particular example use case, the message may be part or all of a blockchain transaction. That is, the signature may be used to sign one or more inputs and/or one or more outputs of a blockchain transaction. For instance, the generated signature may be used, at least in part, to unlock an output of a blockchain transaction. As a particular example, the output of a previous transaction may be a pay-to-public-key-hash (P2PKH) output which is locked to a hash of a public key. In order to be unlocked, an input of a later transaction that references the P2PKH output needs to include the (unhashed) public key and a signature generated based on the private key corresponding to the public key.

Represented in script, the "locking script" and "unlocking script" may take the following forms:

Locking script=OP_DUP OP_HASH160<Public KeyHash>OP_EQUAL OP_CHECKSIG Unlocking script=<Signature><Public Key>

Referring to the above described embodiments, the <Public Key> may be equated to $P=a_{child}\cdot G$, and the <Signature> comprises the threshold signature s, where the previous transaction is the message to be signed. Note that as stated above, ECDSA signatures are in the form (r, s).

Note that the described signature generation method is not limited to any particular use case and may in general be used for generating a signature based on any message. Signing all or part of a blockchain transaction is just one illustrative example. The described method may be used to sign and/or authorise, for instance, a legal document (e.g. a will, deed or other contract), correspondence between one or more parties, digital certificates (e.g. issued by a certificate authority), medical prescriptions, a bank transfer or a financial instrument, a mortgage or loan applications, etc.

As a particular example, the group of participants (say five participants in total) may form the board of a company. Voting matters of the company may require a majority of the board (i.e. at least three participants) to agree on the particular vote. The board may use the described signature generation method to prove that at least three board members agreed to vote in favour of a particular outcome. In this example, the threshold of the signature generation scheme is three. That is, at least three of the board members must provide a respective signature share in order for the co-ordinator to successfully generate a signature. If a signature is generated successfully, at least the threshold number (i.e. three) of board members must have agreed to vote in favour of that outcome. Thus the successful generation of a signature acts as a record of the vote and proves that a majority of the board voted in a particular way.

Another use case for the present invention lays in the field of digital certificates, e.g. digital certificate issued by the X.509 standard. A digital certificate contains a signature that signs over some data. The data can in general be any data, but one particular example of data included in a digital certificate is a public key. A public key in a digital certificate is often referred to as a "certified public key". The issuer of the digital certificate (a "certificate authority") may perform one or more checks on the owner of the public key (e.g. know-your-customer checks), and if the checks are successful, the certificate authority issues a digital certificate that includes the certified public key. A user can use a certified public key to prove they are who they say they are, e.g. by signing a message with a private key corresponding to the certified public key. One particular use for certificate authorities is to sign certificates used in HTTPS for secure browsing on the internet. Another common use is in issuing identity cards by national governments for use in electronically signing documents. The certificate authority signs the public key (or any other data to be attested to) using a private key.

As stated above, embodiments of the present invention may involve encrypting a message with a public key corresponding to a private key share, and similarly decrypting the message with a private key share. In that case, the first participant 102*a* may decrypt the message that has been encrypted by a different party. As another option, a message may be encrypted with a public key corresponding to a full private key, e.g. a full child key. In that case, at least a threshold number of participants may make their respective shares of the child private key available in order to decrypt the message. The message that is encrypted may comprise some or all of a blockchain transaction, e.g. encrypted data may be included in a transaction to be recorded on the blockchain.

CONCLUSION

Other variants or use cases of the disclosed techniques may become apparent to the person skilled in the art once given the disclosure herein. The scope of the disclosure is not limited by the described embodiments but only by the accompanying claims.

It will be appreciated that the above embodiments have been described by way of example only. More generally there may be provided a method, apparatus or program in accordance with any one or more of the following Statements.

Statement 1. A computer-implemented method of generating shares of private keys, wherein the method is performed by a first participant of a group of participants and comprises:

obtaining a first seed share, wherein each other participant has a respective seed share;

generating a first master private key share of a shared master private key, wherein the first master private key share is generated based on the first seed share and the respective seed share of each other participant, and wherein each other participant has a respective master private key share; and generating one or more first private key shares based on the first master private key share, wherein each first private key share is a share of a respective shared private key.

Statement 2. The method of statement 1, comprising:

inputting at least the first seed share to a hash function to generate a first component of a first data item, wherein each other participant has a respective data item; and obtaining the respective data items generated by the other participants, wherein the first master private key share is generated based on the first data item and the respective data items.

Statement 3. The method of statement 2, wherein the inputting of at least the first seed share to the hash function comprises inputting at least the first seed share to a HMAC function to generate a first HMAC value, and wherein the first data item is a first part of the first HMAC value.

Statement 4. The method of any preceding statement, wherein the first master private key share is generated by performing a secret sharing scheme to generate a share of a first secret, wherein the first secret is the master private key.

Preferably the first secret is a threshold secret, where at least a threshold number of shares are required to reconstruct the shared secret. The secret sharing scheme may be JVRSS, SSSS, etc.

Statement 5. The method of any preceding statement, comprising generating a hierarchical deterministic key structure of private key shares, wherein the one or more first private key shares generated based on the first master private key share are respective parent private key shares, and/or respective child private key shares, wherein each parent private key share of a given level in the key structure is a parent to one or more child private key shares in a subsequent level in the key structure.

Statement 6. The method of any preceding statement, comprising obtaining one or more auxiliary private keys, and wherein each of the one or more first private key shares is generated based on the first master private key share and a respective one of the one or more auxiliary private keys.

Statement 7. The method of statement 5 or statement 6, comprising generating a first auxiliary master private key, and wherein each of the one or more auxiliary private keys is generated based on the first auxiliary master private key.

Statement 8. The method of statement 7, comprising obtaining a common seed value, wherein each other participant has the same common seed value, and wherein the first auxiliary master private key is generated based on the common seed value.

Statement 9. The method of statement 8, wherein generating the common seed value comprises:

performing a secret sharing scheme to generate a first share of a second secret, wherein the second secret is a second private key;

generating a first combined share based on the first master private key share and the first secret share of the second private key;

obtaining at least a predetermined number of other combined shares, wherein each other combined share is generated by another participant and is based on a respective share of the master private key and a respective share of the second private key; and generating the common seed based on the first combined share and at least the predetermined number of other combined shares.

Statement 10. The method of statement 8 or statement 9, wherein generating the first auxiliary master private key share comprises inputting the common seed value to a hash function.

Statement 11. The method of statement 10, wherein inputting the common seed to the hash function comprises inputting the common seed to a HMAC function to generate a second HMAC value, and wherein the first master private key share is a first component of the second HMAC value.

Statement 12. The method of statement 5, wherein each first child private key share is generated based on a respective parent private key share, wherein each first child private key share is generated based on a respective first term and a respective second term, wherein the respective first term is generated based on the respective parent private key share, and wherein the respective second term is generated by inputting into a hash function at least i) the respective parent private key share or corresponding public key, and ii) a respective index of the respective first child private key share.

Statement 13. The method of statement 12, comprising for each first child private key share, generating a respective parent chain code share of the respective parent private key share, wherein the respective second term is generated by inputting into the hash function iii) the first master chain code share.

Statement 14. The method of statement 5, 12 or 13, comprising:

generating a first parent chain code share of a first parent private key share, the first parent private key share being a share of a first parent private key;

obtaining a respective parent chain code share from each other participant;

generating a common chain code based on each parent chain code share;

obtaining a first parent public key corresponding to the first private key, and wherein one or more first child key shares are generated based on a respective first term and a respective second term, wherein the respective first term is generated based on the first parent private key share, and wherein the respective second term is generated by inputting into a hash function at least i) the first parent public key, ii) a respective index of the respective first child private key share, and iii) the common chain code.

Statement 15. The method of any of statements 12 to 14, wherein the hash function is a HMAC function.

Statement 16. The method of any preceding statement, comprising performing a signing phase of a digital signature scheme, wherein said performing comprises:

obtaining a message; and generating a first signature share based on the message and one of the first private key shares.

Preferably the signature scheme is a threshold signature scheme. More preferably, the signature scheme is a threshold optimal signature scheme.

Statement 17. The method of statement 16, wherein the message comprises at least part of a blockchain transaction.

Statement 18. Computer equipment comprising:

memory comprising one or more memory units; and processing apparatus comprising one or more processing units, wherein the memory stores code arranged to run on the processing apparatus, the code being configured so as when on the processing apparatus to perform the method of any of statement 1 to 17.

Statement 19. A computer program embodied on computer-readable storage and configured so as, when run on one or more processors, to perform the method of any of statement 1 to 17.

According to another aspect disclosed herein, there may be provided a method comprising the actions of each participant.

According to another aspect disclosed herein, there may be provided a system comprising the computer equipment of each participant.

The invention claimed is:

1. A computer-implemented method of generating shares of private keys, wherein the method is performed by a first participant of a group of participants and comprises:

obtaining a first seed share, wherein each other participant has a respective seed share;

inputting at least the first seed share to a cryptographic hash function and executing the cryptographic hash function on at least the first seed share to generate a first component of a first data item, wherein each other participant has a respective data item;

obtaining the respective data items generated by the other participants;

generating a first master private key share of a shared master private key, wherein the first master private key share is generated based on the first data item and the respective data items generated by the other participants, and wherein each other participant has a respective master private key share of the shared master private key; and generating one or more first private key shares based on the first master private key share, wherein each first private key share is a share of a respective shared private key;

generating a hierarchical deterministic key structure of private key shares, wherein the one or more first private key shares generated based on the first master private key share are respective parent private key shares, and/or respective child private key shares, wherein each parent private key share of a given level in the key structure is a parent to one or more child private key shares in a subsequent level in the key structure;

generating a first parent chain code share of a first parent private key share, the first parent private key share being a share of a first parent private key;

obtaining a respective parent chain code share from each other participant;

generating a common chain code based on each parent chain code share; and obtaining a first parent public key corresponding to the first private key, wherein one or more first child key shares are generated based on a respective first term and a respective second term, wherein the respective first term is generated based on the first parent private key share, and wherein the respective second term is generated by inputting into a hash function at least i) the first parent public key, ii) a respective index of the respective first child private key share, and iii) the common chain code.

2. The method of claim 1, wherein the inputting of at least the first seed share to the hash function comprises inputting at least the first seed share to a HMAC function to generate a first HMAC value, and wherein the first data item is a first part of the first HMAC value.

3. The method of claim 1, wherein the first master private key share is generated by performing a secret sharing scheme to generate a share of a first secret, wherein the first secret is the master private key.

4. The method of claim 1, comprising obtaining one or more auxiliary private keys, and wherein each of the one or more first private key shares is generated based on the first master private key share and a respective one of the one or more auxiliary private keys.

5. The method of claim 4, comprising generating a first auxiliary master private key, and wherein each of the one or more auxiliary private keys is generated based on the first auxiliary master private key.

6. The method of claim 5, comprising obtaining a common seed value, wherein each other participant has the same common seed value, and wherein the first auxiliary master private key is generated based on the common seed value.

7. The method of claim 6, wherein generating the common seed value comprises:

performing a secret sharing scheme to generate a first share of a second secret, wherein the second secret is a second private key;

generating a first combined share based on the first master private key share and the first secret share of the second private key;

obtaining at least a predetermined number of other combined shares, wherein each other combined share is generated by another participant and is based on a respective share of the master private key and a respective share of the second private key; and generating the common seed based on the first combined share and at least the predetermined number of other combined shares.

8. The method of claim 6, wherein generating the first auxiliary master private key comprises inputting the common seed value to a hash function.

9. The method of claim 8, wherein inputting the common seed to the hash function comprises inputting the common seed to a HMAC function to generate a second HMAC value, and wherein the first master private key share is a first component of the second HMAC value.

10. The method of claim 1, wherein each first child private key share is generated based on a respective parent private key share, wherein each first child private key share is generated based on a respective first term and a respective second term, wherein the respective first term is generated based on the respective parent private key share, and wherein the respective second term is generated by inputting into a hash function at least i) the respective parent private key share or corresponding public key, and ii) a respective index of the respective first child private key share.

11. The method of claim 10, comprising for each first child private key share, generating a respective parent chain code share of the respective parent private key share, wherein the respective second term is generated by inputting into the hash function iii) a first master chain code share.

12. The method of claim 10, wherein the hash function is a HMAC function.

13. The method of claim 1, comprising performing a signing phase of a digital signature scheme, wherein said performing comprises:

obtaining a message; and generating a first signature share based on the message and one of the first private key shares.

14. The method of claim 13, wherein the message comprises at least part of a blockchain transaction.

15. A computing device comprising:

memory comprising one or more memory units; and processing apparatus comprising one or more processing units, wherein the memory stores code arranged to run on the processing apparatus, the code being configured so as when run on the processing apparatus, the processing apparatus performs method of generating shares of private keys, wherein the method is performed by a first participant of a group of participants and comprises:

obtaining a first seed share, wherein each other participant has a respective seed share;

inputting at least the first seed share to a cryptographic hash function to generate a first component of a first data item and executing the cryptographic hash function on at least the first seed share, wherein each other participant has a respective data item;

obtaining the respective data items generated by the other participants;

generating a first master private key share of a shared master private key, wherein the first master private key share is generated based on the first data item and the respective data items generated by the other participants, and wherein each other participant has a respective master private key share; and generating one or more first private key shares based on the first master private key share, wherein each first private key share is a share of a respective shared private key;

generating a hierarchical deterministic key structure of private key shares, wherein the one or more first private key shares generated based on the first master private key share are respective parent private key shares, and/or respective child private key shares, wherein each parent private key share of a given level in the key structure is a parent to one or more child private key shares in a subsequent level in the key structure;

generating a first parent chain code share of a first parent private key share, the first parent private key share being a share of a first parent private key;

obtaining a respective parent chain code share from each other participant; and generating a common chain code based on each parent chain code share;

obtaining a first parent public key corresponding to the first private key, wherein one or more first child key shares are generated based on a respective first term and a respective second term, wherein the respective first term is generated based on the first parent private key share, and wherein the respective second term is generated by inputting into a hash function at least i) the first parent public key, ii) a respective index of the respective first child private key share, and iii) the common chain code.

16. A non-transitory computer-readable storage medium, comprising a computer program configured so as, when run on one or more processors, the one or more processors perform a method of generating shares of private keys, wherein the method is performed by a first participant of a group of participants and comprises:

obtaining a first seed share, wherein each other participant has a respective seed share;

inputting at least the first seed share to a cryptographic hash function and executing the cryptographic hash function on at least the first seed share to generate a first component of a first data item, wherein each other participant has a respective data item;

obtaining the respective data items generated by the other participants generating a first master private key share of a shared master private key, wherein the first master private key share is generated based on the first data item and the respective data item generated by the other participants, and wherein each other participant has a respective master private key share; and generating one or more first private key shares based on the first master private key share, wherein each first private key share is a share of a respective shared private key;

generating a hierarchical deterministic key structure of private key shares, wherein the one or more first private key shares generated based on the first master private key share are respective parent private key shares, and/or respective child private key shares, wherein each parent private key share of a given level in the key structure is a parent to one or more child private key shares in a subsequent level in the key structure;

generating a first parent chain code share of a first parent private key share, the first parent private key share being a share of a first parent private key;

obtaining a respective parent chain code share from each other participant; and generating a common chain code based on each parent chain code share;

obtaining a first parent public key corresponding to the first private key, wherein one or more first child key shares are generated based on a respective first term and a respective second term, wherein the respective first term is generated based on the first parent private key share, and wherein the respective second term is generated by inputting into a hash function at least i) the first parent public key, ii) a respective index of the respective first child private key share, and iii) the common chain code.

* * * * *